UNITED STATES PATENT OFFICE 2,177,619

PROCESS OF PRODUCING NITRILES

Otto Nicodemus, Frankfort-on-the-Main, and Otto Wulff, Koenigstein in Taunus, Germany, assignors to I. G. Farbenindustrie Aktiengesellschaft, Frankfort-on-the-Main, Germany No Drawing. Original application January 28, 1935, Serial No. 3,806. Divided and this application August 27, 1937, Serial No. 161,237. In Germany August 5, 1933

6 Claims. (Cl. 260—464)

The present application is a divisional application of our copending application Ser. No. 3,806, filed January 28, 1935.

The present invention relates to a process of producing nitriles.

It has already been proposed to produce oleic acid nitrile by reacting oleic acid methyl ester with ammonia at about 500° C. in the presence of aluminium oxide. The product thus obtained contains considerable amounts of undesired decomposition and conversion products and the nitrile desired is obtained in low yields.

We have now found that high molecular aliphatic nitriles may be obtained industrially in a satisfactory manner by passing fatty acids containing at least 8 carbon atoms per molecule and being free from hydroxy groups, or esters of these acids in the vapor phase together with ammonia over dehydrating catalysts at temperatures between 320° and 420° C., preferably between 330° and 380° C. Initial materials consisting of or containing preponderating amounts of fatty acids with at least 12 carbon atoms or their esters are preferred starting materials.

The most suitable initial materials are for example lauric, palmitic, stearic, oleic, linoleic and montanic acid as well as mixtures of such acids as can be obtained for example by saponifying fatty substances (i. e., fats and oils) or waxes, for example coco fat, palm kernel fat, linseed oil, tallow, trainoil, beeswax, montan wax and the like. Carboxylic acids or mixtures of carboxylic acids obtainable by oxidizing hard or soft paraffin wax, paraffin or mineral oil may also be employed. As suitable esters there may be mentioned the esters of the said acids with monovalent, preferably monovalent low molecular aliphatic alcohols or polyvalent alcohols, for example their methyl, ethyl, isopropyl, butyl, glycerol esters and the like.

Suitable dehydrating catalysts are for example alumina which may be employed in the form of bauxite or hydrargillite, aluminium phosphates, silica gel, active bleaching earths and the like and mixtures of such compounds.

It may be advantageous to add gaseous compounds which act as inert diluents, namely gases, such as hydrogen, nitrogen, carbon dioxide or air, or vapors, such as the vapors of methanol, acetic acid, nitriles, hydrocarbons and the like to the ammonia or to the mixtures to be reacted.

According to the present invention the high molecular aliphatic nitriles are obtained in very good yields and in a very pure state.

Sometimes it is advantageous to treat the nitriles before the distillation or before any further treatment or use with acid, alkaline or oxidizing agents, such as diluted hydrochloric acid, sulphuric acid, acetic acid, diluted alkali lyes, solutions of potassium permanganate, hydrogen peroxide and the like; by this treatment the undesired smell which sometimes adheres to the products is removed or improved. The nitriles obtained may be subjected to hydrogenation, if desired after purification, whereby the corresponding high molecular aliphatic amines are produced.

The following examples will further illustrate the nature of the present invention but the invention is not restricted to these examples.

Example 1

4 kilograms of vaporized palm kernal fatty acid (i. e., the mixture of acids obtainable by saponifying palm kernel fat) are passed together with a mixture of 1500 liters of ammonia and 50 liters of nitrogen (measured at ordinary temperature and ordinary pressure) over 30 liters of an aluminium phosphate catalyst per hour at between 340° and 350° C. A mixture of the nitriles corresponding to the acids employed is obtained in the form of a faintly yellow colored oil which may be readily separated from the water formed in the reaction. The crude mixture of nitriles is distilled; 95 per cent thereof distill over between 70° and 210° C. under a pressure of 9 millimeters mercury gauge. The product distilled is practically pure.

Example 2

125 kilograms of vaporized coco fatty acid (i. e., the mixture of acids obtainable by saponifying coco fat) are passed together with 62.5 cubic meters of ammonia (measured at ordinary temperature and at ordinary pressure) in the course of 24 hours over 40 liters of a catalyst consisting of bauxite at between 350° and 370° C. The crude mixture of nitriles thus produced is washed with an about 7 per cent aqueous hydrochloric acid and subsequently with diluted caustic soda solution, dried and distilled.

Instead of treating the crude nitrile mixture with dilute hydrochloric acid and caustic soda solution, it may be treated with an alkaline potassium permanganate solution until the solution is no longer decolorized. After drying and distillation a colorless product is obtained.

Example 3

Solidified palm kernel fat is saponified by treatment with alkalies. The fatty acids are set free from the soaps obtained and passed together with ammonia at 360° C. over a silica gel catalyst. A mixture of high molecular aliphatic nitriles is thus obtained which is distilled and which may be catalytically hydrogenated to the corresponding amines.

Example 4

A vaporous mixture of equal parts by weight of commercial stearic acid and of cyclohexane is passed with from 1.5 to 3 times the amount of ammonia theoretically necessary for the formation of the stearic acid nitrile at from about 370° to 375° C. over bauxite. After separating off the water formed and the cyclohexane, stearic acid nitrile is obtained in a good yield and in a very pure form.

If the reaction is carried out at about 400° C. and with a similar throughput of stearic acid it is preferable to considerably increase the proportion of ammonia, for example up to 10 times the theoretical amount.

Example 5

Oleic acid is sprayed into a vaporizer into which at the same time superheated ammonia is introduced, the amount of ammonia being so selected that 5 times the amount theoretically necessary for the formation of the nitrile is present. The mixture is passed into a catalytic chamber filled with a naturally occurring aluminium oxide which has been partly dehydrated by preheating. In the said chamber the reaction mixture is heated to from 380° to 390° C. The oleic acid nitrile formed is condensed at from 120° to 150° C. After further cooling and drying it is obtained in a practically pure form.

Example 6

Oleic acid methyl ester, small amounts of hydrogen and from 3 to 5 times the amount of ammonia theoretically necessary for the formation of oleic nitrile are vaporized in an evaporator. The vaporized mixture is passed in a catalytic chamber at 370° C. over a catalyst consisting of silica gel. The amount of oleic acid methyl ester passed over the catalyst per day is 5 times the volume of the catalyst (measured in the liquid state). The material is passed only once over the catalyst and the conversion into oleic nitrile is practically complete. The reaction mixture leaving the catalytic chamber is worked up as described in Example 5.

Instead of oleic acid methyl ester a mixture of the methyl esters of the fatty acids contained in coco fat or of the carboxylic acids obtainable by oxidation of high molecular paraffinic hydrocarbons such as paraffin wax may be treated as indicated above.

What we claim is:

1. The process of producing nitriles, which comprises passing a substance selected from the class consisting of the fatty acids free from hydroxy groups and containing at least 8 carbon atoms per molecule and the volatilizable esters of the said acids in the vapor phase together with ammonia over a dehydrating catalyst at a temperature between 320° and 420° C.

2. The process of producing nitriles, which comprises passing a substance selected from the class consisting of the fatty acids free from hydroxy groups and containing at least 8 carbon atoms per molecule and the volatilizable esters of the said acids in the vapor phase together with ammonia over a dehydrating catalyst at a temperature between 330° and 380° C.

3. The process of producing nitriles, which comprises passing an ester of a fatty acid free from hydroxy groups and containing at least 8 carbon atoms per molecule with a low molecular monovalent aliphatic alcohol in the vapor phase together with ammonia over a dehydrating catalyst at a temperature between 320° and 420° C.

4. The process of producing nitriles, which comprises passing a mixture of substances selected from the class consisting of the fatty acids which are free from hydroxy groups and contain at least 8 carbon atoms per molecule and the volatilizable esters of the said acids, in the vapor phase together with ammonia over a dehydrating catalyst at a temperature between 320° and 420° C.

5. The process of producing nitriles, which comprises passing a mixture of substances selected from the class consisting of the fatty acids obtainable from naturally occurring fatty substances which acids are free from hydroxy groups and contain at least 8 carbon atoms per molecule and the volatilizable esters of the said acids, in the vapor phase together with ammonia over a dehydrating catalyst at a temperature between 320° and 420° C.

6. The process of producing nitriles, which comprises passing a substance selected from the class consisting of the fatty acids free from hydroxy groups and containing at least 8 carbon atoms per molecule and the volatilizable esters of the said acids, in the vapor phase together with ammonia and an inert gaseous compound over a dehydrating catalyst at a temperature between 320° and 420° C.

OTTO NICODEMUS.
OTTO WULFF.